United States Patent
Lazar et al.

(10) Patent No.: US 12,314,762 B2
(45) Date of Patent: May 27, 2025

(54) AUTOMATICALLY GENERATING WORKFLOWS ACROSS CLOUD SERVICES INVOLVING USER-CONTROLLED COMPONENTS

(71) Applicant: Dell Products L.P., Round Rock, TX (US)

(72) Inventors: Mihai Lazar, Nepean (CA); Joe Shahram Ghalam, Greenbrae, CA (US); Jonathan P. Streete, South San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 560 days.

(21) Appl. No.: 17/869,230

(22) Filed: Jul. 20, 2022

(65) Prior Publication Data
US 2024/0028399 A1 Jan. 25, 2024

(51) Int. Cl.
*G06F 9/50* (2006.01)
*G06F 9/445* (2018.01)

(52) U.S. Cl.
CPC ........ *G06F 9/5016* (2013.01); *G06F 9/44505* (2013.01)

(58) Field of Classification Search
None
See application file for complete search history.

(56) References Cited

U.S. PATENT DOCUMENTS

| | | |
|---|---|---|
| 11,361,086 B2 | 6/2022 | Joshi et al. |
| 11,373,124 B2 | 6/2022 | Chandrasekharan et al. |
| 2010/0071053 A1* | 3/2010 | Ansari ............... H04L 12/2814 709/206 |
| 2020/0117481 A1 | 4/2020 | Chen et al. |
| 2021/0409409 A1 | 12/2021 | Palanisamy |
| 2023/0128728 A1* | 4/2023 | Shuvaev ............... G06F 16/116 705/7.26 |

* cited by examiner

*Primary Examiner* — Quang N Nguyen
(74) *Attorney, Agent, or Firm* — Ryan, Mason & Lewis, LLP

(57) ABSTRACT

Methods, apparatus, and processor-readable storage media for automatically generating workflows across cloud services involving user-controlled components are provided herein. An example computer-implemented method includes processing a user request to perform configuration operations on cloud services components, wherein at least one of the cloud services components is user-controlled; generating one or more automation files containing one or more workflows related to configuration operations on the cloud services components; outputting at least a portion of the one or more automation files containing at least a portion of the workflow(s) related to configuration operations on the at least one user-controlled cloud services component to at least one secure storage area accessible to at least one user via one or more cryptographic techniques; processing feedback pertaining to user execution of the at least a portion of the one or more automation files; and performing one or more automated actions based on the feedback.

20 Claims, 6 Drawing Sheets

Loop: Wait for request from Interface Console
    Parse request and determine ordered list of components to configure (INPUT: Request, OUTPUT: Ordered List of Components
with their respective parameters)
        // Note. The list is ordered based on the sequence of components to be configured: if component A needs to be configured
before component B, it will appear before component B in the list
    Execution Loop: For each component C in the ordered list
        IF C is Remotely-Operated
            Execute the configuration operations for C (INPUT: C with configuration parameters; OUTPUT: OperationResult)
            // To this purpose, the rule-based configuration orchestrator invokes the programmatic API of component C
        ELSE IF C is User-Controlled
            Generate Workflow Automation Script (INPUT: C with configuration parameters; OUTPUT: UserID, RequestID, Workflow
Automation Script)
            Store Workflow Automation Script in Secure Storage Area (INPUT: UserID, RequestID, Workflow Automation Script)
            Notify User (e.g., via email or other agreed-upon API notification) that a new Workflow Automation Script for their
component is available in the Secure Storage Area (INPUT: UserID, RequestID)
```

```
// At this stage, the UserID can be used to retrieve the Workflow Automation Script from the Secure Storage Area
// To this purpose, the user calls an API function: GetWorkflowScript(INPUT: UserID, RequestID; OUTPUT: Workflow Automation Script)
Wait for Workflow Automation Script result (INPUT: UserID, RequestID)
// At this point, the user executes the Workflow Automation Script, and
// Stores the OperationResult in Secure Storage Area, using an API function: PutWorkflowScriptResult(INPUT: UserID, RequestID, OperationResult)
// where the OperationResult is provided by the Workflow Automation Script
Get Workflow Automation Script result ((INPUT: UserID, RequestID; OUTPUT: OperationResult)

IF OperationResult.status is FAILED
    Exit the loop and roll back previous operations
    Determine failure cause from OperationResult and generate information to be provided to the Interface Console
// Else continue the loop until all components are configured Communicate the result (SUCCESS or FAILED) to the Interface Console:
Communicate the result to the user
```

FIG. 3 cont.

AUTOMATICALLY GENERATING WORKFLOWS ACROSS CLOUD SERVICES INVOLVING USER-CONTROLLED COMPONENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques involving cloud services in connection with such systems.

BACKGROUND

Managing multi-cloud deployments presents challenges when services in one cloud service require configuration changes in one or more other cloud services. For example, an application executing in a cloud service provider may require access to a remote hosted storage service. In such scenarios, conventional cloud management approaches commonly require obtaining credentials to each of multiple environments, but users are often unlikely and/or unwilling to provide cloud service provider credentials, limiting the effectiveness of such approaches.

SUMMARY

Illustrative embodiments of the disclosure provide techniques for automatically generating workflows across cloud services involving user-controlled components. An exemplary computer-implemented method includes processing at least one user request to perform configuration operations on two or more cloud services components, wherein at least one of the two or more cloud services components is user-controlled, and generating, using at least one rule-based configuration orchestrator, one or more automation files containing one or more workflows related to configuration operations on the two or more cloud services components. The method also includes outputting at least a portion of the one or more automation files containing at least a portion of the one or more workflows related to configuration operations on the at least one user-controlled cloud services component to at least one secure storage area accessible to at least one user via one or more cryptographic techniques. Further, the method includes processing feedback pertaining to user execution of the at least a portion of the one or more automation files containing at least a portion of the one or more workflows related to configuration operations on the at least one user-controlled cloud services component, and performing one or more automated actions based at least in part on the feedback.

Illustrative embodiments can provide significant advantages relative to conventional cloud management approaches. For example, problems associated with limited effectiveness of attempting to coordinate obtainment of cloud service provider credentials from users are overcome in one or more embodiments through automatically generating workflows across cloud services including cloud services containing user-controlled components.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for implementing a rule-based configuration orchestrator in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
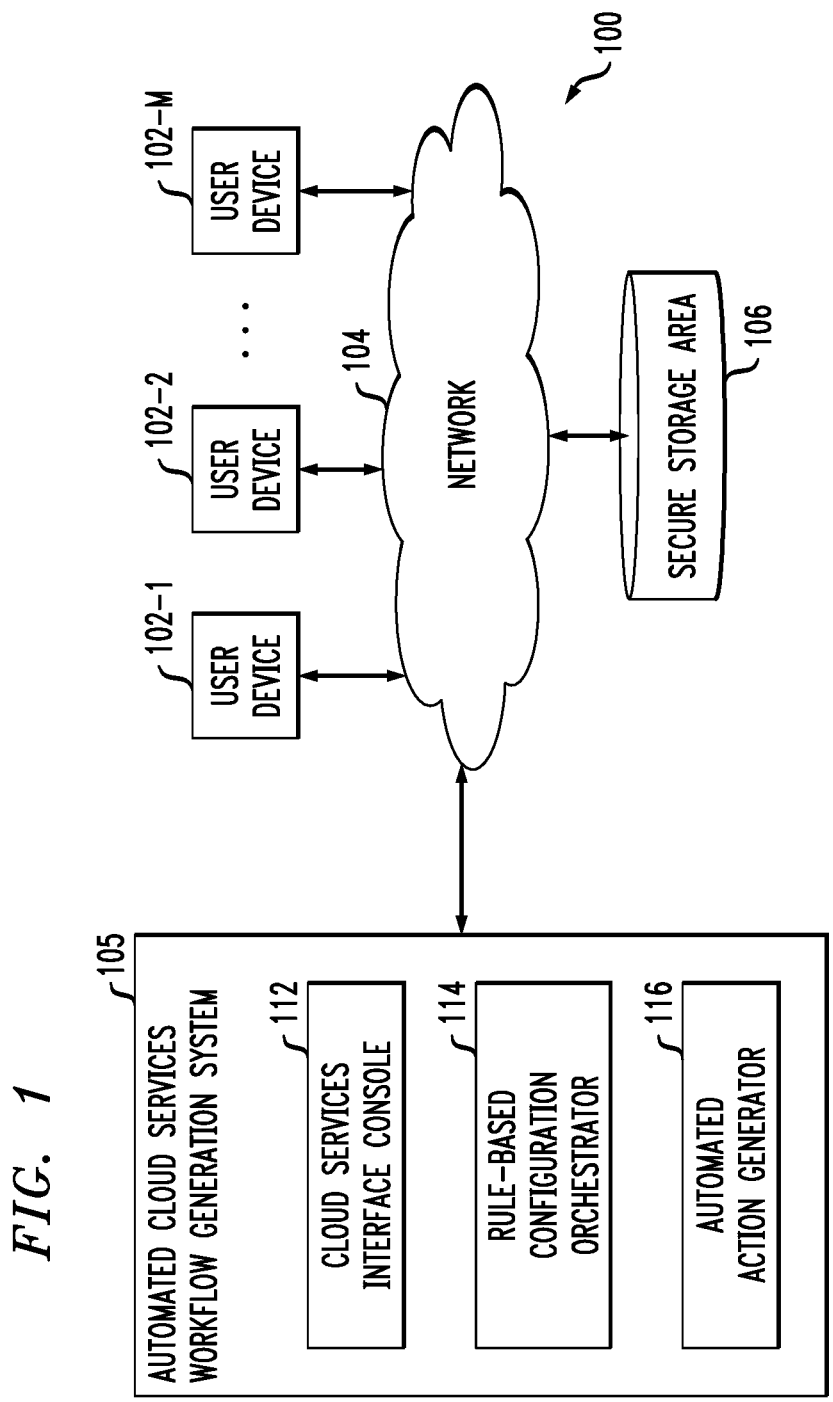
FIG. 1 shows an information processing system configured for automatically generating workflows across cloud services involving user-controlled components in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated cloud services workflow generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated cloud services workflow generation system 105 can have an associated secure storage area 106 configured to store data pertaining to different cloud services, cloud service providers, systems and/or system components, which comprise, for example, configuration data, execution data, etc.

The secure storage area 106 in the present embodiment is implemented using one or more storage systems associated with automated cloud services workflow generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage. In one or more embodiments, secure storage area 106 can include one or more encrypted storage devices, one or more encrypted file systems, one or more encrypted databases, etc.

Also associated with automated cloud services workflow generation system 105 are one or more input-output devices, which illustratively comprise keyboards, displays or other types of input-output devices in any combination. Such input-output devices can be used, for example, to support one or more user interfaces to automated cloud services workflow generation system 105, as well as to support communication between automated cloud services workflow generation system 105 and other related systems and devices not explicitly shown.

Additionally, automated cloud services workflow generation system 105 in the FIG. 1 embodiment is assumed to be implemented using at least one processing device. Each such processing device generally comprises at least one processor and an associated memory, and implements one or more functional modules for controlling certain features of automated cloud services workflow generation system 105.

More particularly, automated cloud services workflow generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated cloud services workflow generation system 105 to communicate over the network 104 with the user devices 102, and illustratively comprises one or more conventional transceivers.

The automated cloud services workflow generation system 105 further comprises cloud services interface console 112, rule-based configuration orchestrator 114, and automated action generator 116.

As further detailed herein, cloud services interface console 112 can include at least one interface used by users (e.g., customers) to provision one or more cloud services and/or one or more other services (e.g., compute services, storage services, etc.) from at least one given enterprise.

It is to be appreciated that this particular arrangement of elements 112, 114 and 116 illustrated in the automated cloud services workflow generation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically generating workflows across cloud services involving user-controlled components involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated cloud services workflow generation system 105 and secure storage area 106 can be on and/or part of the same processing platform.

An exemplary process utilizing elements 112, 114 and 116 of an example automated cloud services workflow generation system 105 in computer network 100 will be described in more detail with reference to the flow diagram of FIG. 4.

Accordingly, at least one embodiment includes automatically generating workflows across cloud services involving user-controlled components. As further detailed herein, one or more embodiments include generating and/or implementing an automation service in connection with at least one remote location (e.g., a cloud service, a remote hosted storage service, etc.), wherein the service can automate the configuration of at least a portion of the remote location, as well as provide localized workflows for one or more orchestration frameworks (for example, a configuration management tool such as Ansible, or an infrastructure as code platform such as Terraform). Users (e.g., customers at a remote location) can add and/or input their credentials to these workflows and execute the workflows in the context of the given environment (e.g., a data center environment, a cloud service provider environment, etc.) to complete at least one related configuration setup.

Additionally, and as further detailed herein, one or more embodiments including automating processes to communicate with users (e.g., customers) regarding what steps need to be taken in order to configure one or more user-controlled cloud services components. Also, in the case of failures, such an embodiment includes automating processes to obtain sufficient data from users to determine the root cause(s) of the failures.

In connection with one or more embodiments, users may provide environmental information (for example, security credentials, IP addresses, host names, LAN identifiers (IDs), etc.) that they are willing to share when executing the remote automation service. The remote automation service can then use at least a portion of the provided environmental information in one or more localized scripts and/or workflows. As used herein, a script refers to an implementation of a workflow, wherein a workflow refers to a sequence of actions to be executed (e.g., a sequence of actions required to setup a cloud service and/or cloud services component). Additionally or alternatively, at least one embodiment includes configuring the remote automation service to use one or more placeholders for environmental information not provided by the user(s). The resulting scripts and/or workflows generated and/or provided to the user(s) can be signed with one or more certificates, in order to validate the chain of trust of each script and/or workflow.

Also, in one or more embodiments, each setup set (e.g., a set of scripts that allow a user (e.g., a customer) to configure a service) is tagged with appropriate information (e.g., customer ID, system ID, request ID, etc.), and the delivered and/or provided package can include appropriate documentation for users to understand the contents and execution process(es) of the package. At least one embodiment includes automatically generating such documentation using at least a portion of the environmental data provided by the user(s) and/or one or more placeholder identifiers, along with instructions regarding what should be used for the one or more placeholders when the scripts and/or workflows are executed. Users can (offline, for example) examine and validate the contents of the automation files prior to execution. Alternatively, in one or more embodiments, the auto-generated setup files can be self-executing (e.g., using container images, etc.). By way of example, with respect to self-executing setup files, in one or more embodiments, setup files can be included in a container image, and when a user instantiates the image as a container instance, the scripting engine (a computer program) provided with the container image executes all of the scripts necessary for the configuration of the desired service(s).

One or more of the files provided in connection with an automation service can be referred to herein as a change set, and such files can include, for example, one or more scripts and/or one or more workflows necessary to automate one or more relevant configuration changes, one or more scripts and/or one or more workflows necessary to automate at least one rollback if at least a portion of the automated configuration fails to complete successfully, and/or appropriate and/or customized documentation to guide the user in executing at least a portion of the one or more scripts and/or one or more workflows.

In one or more embodiments, the process of generating and/or providing change set files to one or more users is automated. By way of example, change set files may be provided (e.g., to one or more users) using at least one secure storage area (protected, e.g., using encryption and/or authentication techniques), using at least one representational state transfer (REST) application programming interface (API) and/or one or more similar APIs presented by the user(s), via email, and/or via one or more other mechanisms capable of securely communicating the one or more scripts and/or one or more workflows and associated files to the user(s).

When executed by a user, such a change set as detailed herein in connection with one or more embodiments automatically generates at least one output (e.g., an output for remote site support staff and/or the user) to examine the result(s) of the execution. Such results can include, for example, a summary of the execution (e.g., a passing indication or a failing indication), one or more logs, and/or status information of a target system resulting from the setup execution. Such results can also be automatically post-processed and/or examined by the user, if desired and/or required.

In at least one embodiment, notification of the execution results can be generated and/or provided to the given remote location. Such notification can be carried out, for example, by the user writing and/or providing a result file into at least one secure storage area, by the one or more scripts and/or one or more workflows automatically communicating with at least one API endpoint accessed by the one or more scripts and/or one or more workflows, by use of at least one secure user interface, and/or by use of one or more other secure communications mechanisms agreed upon by the remote site and the user. Additionally, in one or more embodiments, information pertaining to execution history may be maintained in at least one secure storage area (e.g., for audit purposes, for model training purposes, etc.).

As detailed herein, one or more embodiments include automating the configuration process of locations wherein remote automation frameworks are unable to directly manipulate the configuration of assets at the location. As used herein, "locations" in this context can include computing and/or storage environments such as, for example, one or more user data centers, one or more services hosted by a cloud service provider, dark sites hosted by users wherein the remote location is the user's own data center(s) and wherein the management of the dark site cannot be automated from the primary data center, etc. As used herein a dark site refers to a user (e.g., customer) location to which the solution provider (e.g., an enterprise) does not have remote access.

Additionally, using one or more embodiments, a configuration process can be automated for the user and a relevant remote automation provider. For example, a remote automation provider can supply localized, autogenerated, and trusted setup automation files (also referred to herein as a change set) that can be executed offline by the user. At least one embodiment can also include verifying and/or troubleshooting at least one offline setup execution, using one or more logs, one or more activity reports, and/or status information, which can be at least a part of an output of the automation file(s) execution.

As also detailed herein, in one or more embodiments, the automation of a setup at a user site can be achieved using an orchestrator (e.g., rule-based configuration orchestrator 114 in the FIG. 1 embodiment and/or rule-based configuration orchestrator 214 in the FIG. 2 embodiment) managed by the remote provider (e.g., even without direct access to the system components managed by the user). Automation can be achieved, for example, by using at least one information exchange mechanism (e.g., at least one programmatic API, at least one secure storage area, etc.), and by processing at least a portion of the results from the change set. Additionally, in at least one embodiment, access to such an information exchange mechanism can be automated, for example, using at least API.

Figure 2:
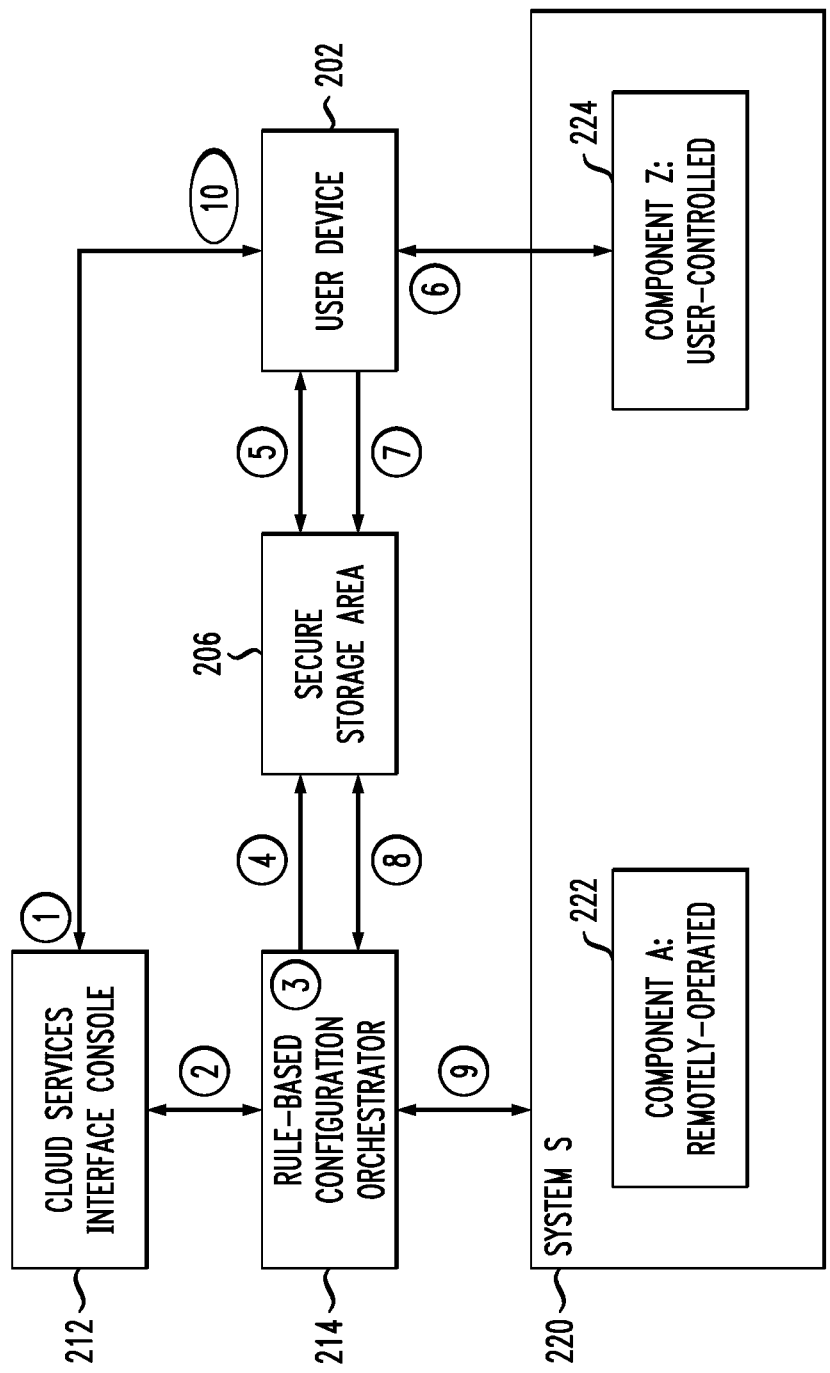
FIG. 2 shows an example workflow implementation in an illustrative embodiment.

By way merely of illustration, consider the example implementation of one or more embodiments depicted in connection with FIG. 2. As depicted in the FIG. 2 example, System S 220 includes Component A 222, which is remotely-operated (e.g., a Smart Network Fabric (SN-Fabric) and provided and/or controlled by Enterprise1, and Component Z 224, which is user-controlled, and not accessible to Enterprise1 (e.g., a Cloud Service Provider). By way merely of example, enterprise-controlled and/or remotely-operated components can include, for instance, components pertaining to one or more enterprise compute systems, one or more database services, etc., while user-controlled components can include, for instance, components pertaining to one or more storage systems at a dark site.

At least one embodiment can include determining a configuration order that can support both cases: Component A 222 then Component Z 224, and Component Z 224 then Component A 222. With respect to the case of Component A 222 then Component Z 224, cloud services interface console 212 is utilized. For example, in connection with one or more embodiments, cloud services interface console 212 is used to automate the configuration of Component A 222, and generate configuration information for Component Z 224, which includes generating, using rule-based configuration orchestrator 214, one or more scripts and/or one or more workflows and documentation to configure Component Z 224. Also, the generated scripts and/or workflows can be delivered and/or output, for example, to secure storage area 206.

With respect to configuring Component Z 224, the user (via user device 202) can access the generated scripts and/or workflows from secure storage area 206, execute at least a portion of the scripts and/or workflows, and generate and/or provide results of the execution, for example, by outputting documentation of the results into the secure storage area 206. The automation process for Component A 222 can include waiting for the results provided by the user with respect to Component Z 224, and then completing the automation of configuring Component A 222 based at least in part on processing those results.

By way of further illustration, in connection with the FIG. 2 embodiment, consider the following example workflow depicted by circled numbers one through ten in FIG. 2. In step one, the user (via user device 202) requests, through cloud services interface console 212, that System S 220 (including Component A 222 and Component Z 224) be configured. In step two, cloud services interface console 212 requests that the rule-based configuration orchestrator 214 perform the configuration of System S 220. In step three, the rule-based configuration orchestrator 214 generates one or more automation files (e.g., one or more scripts and/or one or more workflows) for Component A 222 (which can be accessed by the rule-based configuration orchestrator 214) and Component Z 224 (which the rule-based configuration orchestrator 214 cannot directly access).

In step four, the rule-based configuration orchestrator 214 provides the automation files (e.g., and corresponding documentation, also generated automatically) to the secure storage area 206 and notifies the user via user device 202 (e.g., through an email and/or an API). In step five, the user, via user device 202, obtains and/or accesses the automation files from the secure storage area 206. In step six, the user, via user device 202, examines and/or validates the automation files, then applies them offline using their credentials (e.g., the user's private credentials) for accessing Component Z 224. Accordingly, in one or more embodiments, there is an air gap between the rule-based configuration orchestrator 214 and Component Z 224, wherein the air gap is the responsibility of the user.

In step seven, the user provides the results of the execution of the automation files (on Component Z 224 and received from and/or obtained in connection with Component Z 224) in the secure storage area 206. In step eight, the rule-based configuration orchestrator 214 is automatically notified that the user-initiated configuration operation on Component Z 224 has been completed, and the rule-based configuration orchestrator 214 processes the results from the secure storage area 206. In step nine, the rule-based configuration orchestrator 214 resumes the configuration process for System S 220 (e.g., for Component A 222). In step ten, the user, via user device 202, is notified of the overall result of the configuration of System S 220 through the cloud services interface console 212.

It is to be noted that the above-noted example sequence of events is implemented for a situation wherein Component Z 224 is to be configured before Component A 222, but it is to be appreciated that a similar sequence of events can be implemented for a situation wherein Component A 222 needs to be configured before Component Z 224. For example, in such a situation, the rule-based configuration orchestrator 214 configures Component A 222 and provides the automation files (also referred to as the setup set) to the secure storage area 206 for the user device 202 to access to use for configuring Component Z 224 if the result of configuring Component A 222 is successful (whereas a rollback can be required for Component A 222 if the automation files result in a configuration failure for Component Z 224). It is also to be noted that the above is merely an example, and one or more embodiments can include implementing the techniques detailed herein in situations wherein Component A 222 generates multiple workflows for Component Z 224, such that a corresponding configuration sequence includes Component A 222→Component Z 224→Component A 222→Component Z 224→Component A 222 (and possibly more iterations depending on the complexity of the desired configuration). Additionally, it is to be appreciated that in one or more embodiments, there may be multiple instances of Component A 222 and/or Component Z 224.

FIG. 3 shows example pseudocode for implementing a rule-based configuration orchestrator (such as, for example, rule-based configuration orchestrator 114 in the FIG. 1 embodiment and rule-based configuration orchestrator 214 in the FIG. 2 embodiment) in an illustrative embodiment. In this embodiment, example pseudocode 300 is executed by or under the control of at least one processing system and/or device. For example, the example pseudocode 300 may be viewed as comprising a portion of a software implementation of at least part of automated cloud services workflow generation system 105 of the FIG. 1 embodiment.

The example pseudocode 300 illustrates that the rule-based configuration orchestrator waits for a user request, provided using the cloud services interface console (similar to step one in FIG. 2). The rule-based configuration orchestrator parses the request, determines a list of components to be configured as well as the order in which the components need to be configured (similar to step two in FIG. 2), and subsequently proceeds to configure the components in the required order.

In the case of remotely-operated components (e.g., Component A in FIG. 2), the rule-based configuration orchestrator performs the configuration operations directly (e.g., by calling a programmatic API) (similar to step three in FIG. 2). For user-controlled components (e.g., Component Z 224 in FIG. 2), the rule-based configuration orchestrator generates a workflow script for each such component, assigns a request ID to each such workflow script, stores each workflow script in a secure storage area (similar to step four in FIG. 2), and automatically notifies the corresponding user (e.g., via email or other agreed-upon API notification).

The user then retrieves the workflow script from the secure storage area (similar to step five in FIG. 2) and executes the workflow script in their own operating environment (similar to step six in FIG. 2). Subsequently, the user stores the operation result(s) in the secure storage area using at least one API function (similar to step seven in FIG. 2). The rule-based configuration orchestrator waits for the operation result to be available in the secure storage area, and proceeds accordingly, in case of success or failure as indicated by the operation result(s) (similarly to step eight in FIG. 2).

In the case of failure, the operation result(s) provides data about the failure (e.g., logging records, command execution results, etc.) for the rule-based configuration orchestrator to process to determine one or more root causes of the failure. Based at least in part on such determinations, the rule-based configuration orchestrator can provide relevant information about the failure to the user (and, if relevant, the service provider via the cloud services interface console) (similarly to step ten in FIG. 2).

It is to be appreciated that this particular example pseudocode shows just one example implementation of a rule-based configuration orchestrator, and alternative implementations of the process can be used in other embodiments.

Figure 4:
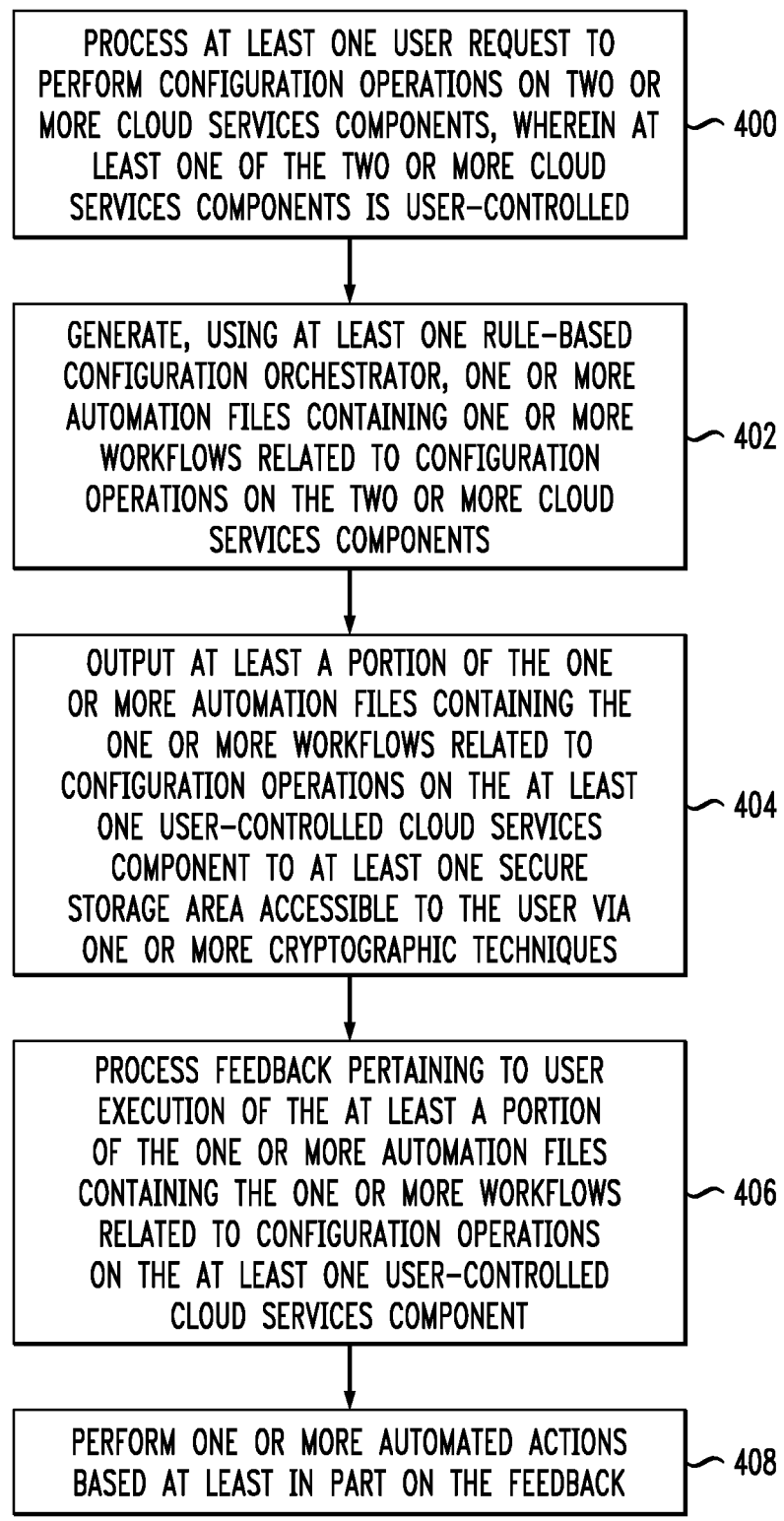
FIG. 4 is a flow diagram of a process for automatically generating workflows across cloud services involving user-controlled components in an illustrative embodiment.

FIG. 4 is a flow diagram of a process for automatically generating workflows across cloud services involving user-controlled components in an illustrative embodiment. It is to be understood that this particular process is only an example, and additional or alternative processes can be carried out in other embodiments.

In this embodiment, the process includes steps 400 through 408. These steps are assumed to be performed by automated cloud services workflow generation system 105 utilizing its elements 112, 114 and 116.

Step 400 includes processing at least one user request to perform configuration operations on two or more cloud services components, wherein at least one of the two or more cloud services components is user-controlled. In at least one embodiment, processing the at least one user request includes obtaining and processing information pertaining to each of the two more cloud services components.

Step 402 includes generating, using at least one rule-based configuration orchestrator, one or more automation files containing one or more workflows related to configuration operations on the two or more cloud services components. In one or more embodiments, generating the one or more automation files includes validating a chain of trust for the one or more automation files by signing the one or more automation files using one or more certificates. In at least one embodiment, processing the at least one user request includes processing user-provided environmental information pertaining to one or more of the user and at least a portion of the two or more cloud services components. In such an embodiment, generating the one or more automation files includes inputting, in the one or more automation files, at least a portion of the user-provided environmental information and inputting one or more placeholders for environmental information not provided by the user.

Step 404 includes outputting at least a portion of the one or more automation files containing at least a portion of the one or more workflows related to configuration operations on the at least one user-controlled cloud services component to at least one secure storage area accessible to the user via one or more cryptographic techniques. Such cryptographic techniques can include, for example, one or more password-related techniques, one or more key-related techniques, one or more biometric-related techniques, one or more encryption techniques, one or more hashing techniques, etc. In at least one embodiment, outputting at least a portion of the one or more automation files containing at least a portion of the one or more workflows related to configuration operations on the at least one user-controlled cloud services component to at least one secure storage area includes automatically outputting a notification, to the user, pertaining to the outputting of the at least a portion of the one or more automation files using one or more application programming interfaces.

Step 406 includes processing feedback pertaining to user execution of the at least a portion of the one or more automation files containing at least a portion of the one or more workflows related to configuration operations on the at least one user-controlled cloud services component. In one or more embodiments, processing the feedback includes accessing the feedback, using one or more cryptographic techniques, from the at least one secure storage area. Also, in at least one embodiment, the feedback includes data, automatically generated by the one or more automation files, in at least one format that can be processed by the at least one rule-based configuration orchestrator. In such an embodiment, the feedback can correspond, for example, to the "Operation Result" detailed in example pseudocode 300 in FIG. 3.

Step 408 includes performing one or more automated actions based at least in part on the feedback. In at least one embodiment, performing one or more automated actions includes automatically executing, based at least in part on the feedback, at least a portion of the one or more automation files containing at least a portion of the one or more workflows related to configuration operations on at least one other of the two or more cloud services components. Additionally or alternatively, performing one or more automated actions can include automatically updating, based at least in part on the feedback, at least a portion of the one or more automation files containing at least a portion of the one or more workflows related to configuration operations on at least one other of the two or more cloud services components, and/or automatically updating, based at least in part on the feedback, at least a portion of the one or more automation files containing at least a portion of the one or more workflows related to configuration operations on the at least one user-controlled cloud services component. Further, in one or more embodiments, performing one or more automated actions includes automatically modifying the at least one rule-based configuration orchestrator based at least in part on the feedback.

Additionally or alternatively, performing one or more automated actions can include storing, in the at least one secure storage area, the one or more automation files and the feedback. In one or more embodiments, persistently storing the one or more automation files and the feedback can be leveraged for purposes of, for example, auditing (at any time in the future) one or more configuration operations and corresponding results, troubleshooting, security-related activities, etc.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate workflows across cloud services involving inaccessible user-controlled sites. These and other embodiments can effectively overcome problems associated with limited effectiveness of attempting to coordinate obtainment of cloud service provider credentials from users.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
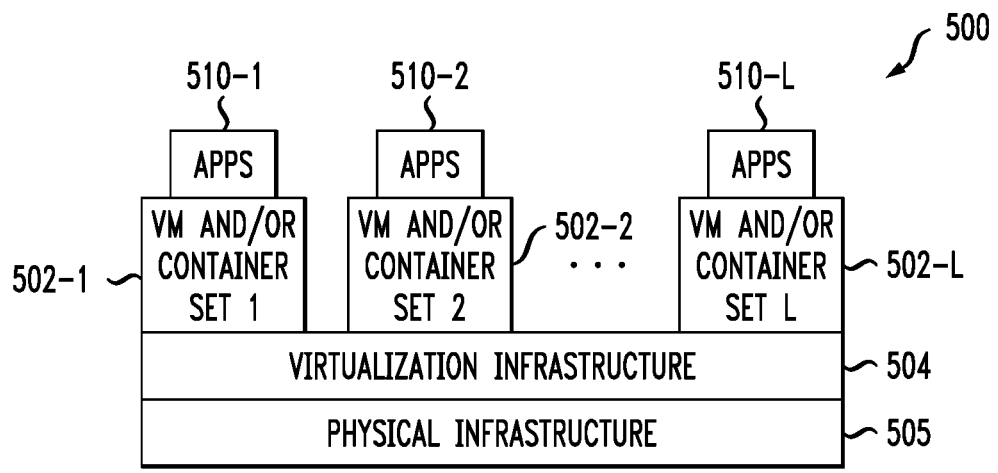
FIGS. 5 and 6 show examples of processing platforms that may be utilized to implement at least a portion of an information processing system in illustrative embodiments.
Figure 6:
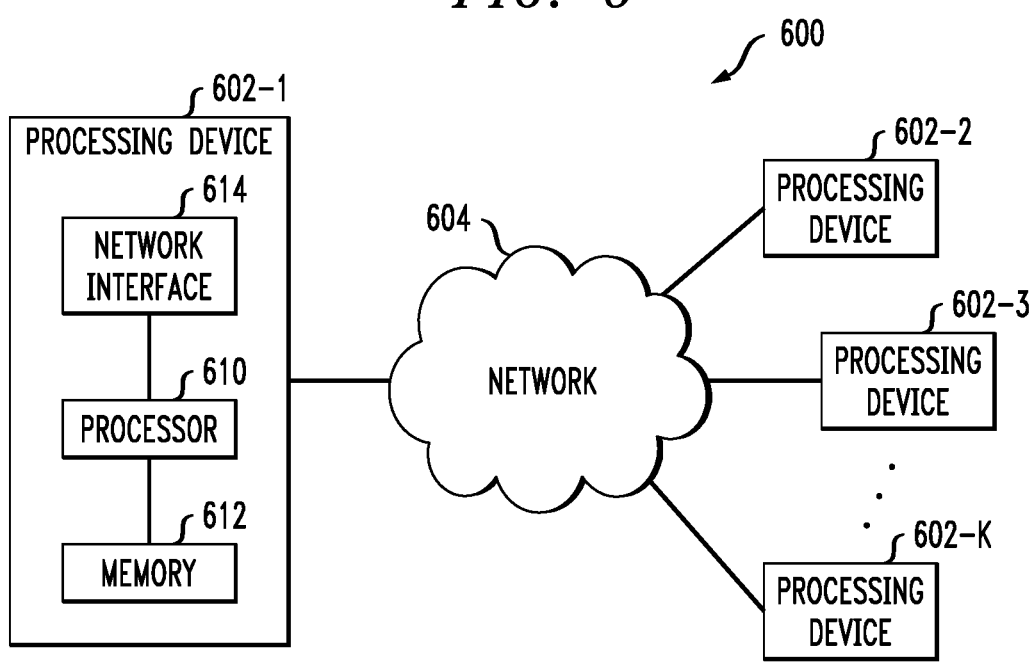

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

processing at least one user request to perform configuration operations on two or more cloud services components, wherein at least one of the two or more cloud services components is user-controlled, wherein processing the at least one user request comprises processing user-provided environmental information pertaining to one or more of the at least one user and at least a portion of the two or more cloud services components;

generating, using at least one rule-based configuration orchestrator, one or more automation files containing one or more workflows related to configuration operations on the two or more cloud services components, wherein generating the one or more automation files comprises inputting, in the one or more automation files, at least a portion of the user-provided environmental information;

outputting at least a portion of the one or more automation files containing at least a portion of the one or more workflows related to configuration operations on the at least one user-controlled cloud services component to at least one secure storage area accessible to the at least one user via one or more cryptographic techniques;

processing feedback pertaining to user execution of the at least a portion of the one or more automation files containing at least a portion of the one or more workflows related to configuration operations on the at least one user-controlled cloud services component; and performing one or more automated actions based at least in part on the feedback;
wherein the method is performed by at least one processing device comprising a processor coupled to a memory.

2. The computer-implemented method of claim 1, wherein performing one or more automated actions comprises automatically executing, based at least in part on the feedback, at least a portion of the one or more automation files containing at least a portion of the one or more workflows related to configuration operations on at least one other of the two or more cloud services components.

3. The computer-implemented method of claim 1, wherein the feedback comprises data, automatically generated by the one or more automation files, in at least one format that can be processed by the at least one rule-based configuration orchestrator.

4. The computer-implemented method of claim 1, wherein performing one or more automated actions comprises storing, in the at least one secure storage area, the one or more automation files and the feedback.

5. The computer-implemented method of claim 1, wherein generating the one or more automation files comprises validating a chain of trust for the one or more automation files by signing the one or more automation files using one or more certificates.

6. The computer-implemented method of claim 1, wherein generating the one or more automation files comprises inputting, in the one or more automation files, one or more placeholders for environmental information not provided by the at least one user.

7. The computer-implemented method of claim 1, wherein processing the at least one user request comprises obtaining and processing information pertaining to each of the two more cloud services components.

8. The computer-implemented method of claim 1, wherein processing the feedback comprises accessing the feedback, using one or more cryptographic techniques, from the at least one secure storage area.

9. The computer-implemented method of claim 1, wherein performing one or more automated actions comprises automatically updating, based at least in part on the feedback, at least a portion of the one or more automation files containing at least a portion of the one or more workflows related to configuration operations on at least one other of the two or more cloud services components.

10. The computer-implemented method of claim 1, wherein performing one or more automated actions comprises automatically updating, based at least in part on the feedback, at least a portion of the one or more automation files containing at least a portion of the one or more workflows related to configuration operations on the at least one user-controlled cloud services component.

11. The computer-implemented method of claim 1, wherein performing one or more automated actions comprises automatically modifying the at least one rule-based configuration orchestrator based at least in part on the feedback.

12. The computer-implemented method of claim 1, wherein outputting at least a portion of the one or more automation files containing at least a portion of the one or more workflows related to configuration operations on the at least one user-controlled cloud services component to at least one secure storage area comprises automatically outputting a notification, to the at least one user, pertaining to the outputting of the at least a portion of the one or more automation files using one or more application programming interfaces.

13. A non-transitory processor-readable storage medium having stored therein program code of one or more software programs, wherein the program code when executed by at least one processing device causes the at least one processing device:
to process at least one user request to perform configuration operations on two or more cloud services components, wherein at least one of the two or more cloud services components is user-controlled, wherein processing the at least one user request comprises processing user-provided environmental information pertaining to one or more of the at least one user and at least a portion of the two or more cloud services components;
to generate, using at least one rule-based configuration orchestrator, one or more automation files containing one or more workflows related to configuration operations on the two or more cloud services components, wherein generating the one or more automation files comprises inputting, in the one or more automation files, at least a portion of the user-provided environmental information;
to output at least a portion of the one or more automation files containing at least a portion of the one or more workflows related to configuration operations on the at least one user-controlled cloud services component to at least one secure storage area accessible to the at least one user via one or more cryptographic techniques;
to process feedback pertaining to user execution of the at least a portion of the one or more automation files containing at least a portion of the one or more workflows related to configuration operations on the at least one user-controlled cloud services component; and
to perform one or more automated actions based at least in part on the feedback.

14. The non-transitory processor-readable storage medium of claim 13, wherein performing one or more automated actions comprises automatically executing, based at least in part on the feedback, at least a portion of the one or more automation files containing at least a portion of the one or more workflows related to configuration operations on at least one other of the two or more cloud services components.

15. The non-transitory processor-readable storage medium of claim 13, wherein performing one or more automated actions comprises storing, in the at least one secure storage area, the one or more automation files and the feedback.

16. The non-transitory processor-readable storage medium of claim 13, wherein generating the one or more automation files comprises inputting, in the one or more automation files, one or more placeholders for environmental information not provided by the at least one user.

17. An apparatus comprising:
at least one processing device comprising a processor coupled to a memory;
the at least one processing device being configured:
to process at least one user request to perform configuration operations on two or more cloud services components, wherein at least one of the two or more cloud services components is user-controlled, wherein processing the at least one user request comprises processing user-provided environmental information pertaining to one or more of the at least one user and at least a portion of the two or more cloud services components;

to generate, using at least one rule-based configuration orchestrator, one or more automation files containing one or more workflows related to configuration operations on the two or more cloud services components, wherein generating the one or more automation files comprises inputting, in the one or more automation files, at least a portion of the user-provided environmental information;

to output at least a portion of the one or more automation files containing at least a portion of the one or more workflows related to configuration operations on the at least one user-controlled cloud services component to at least one secure storage area accessible to the at least one user via one or more cryptographic techniques;

to process feedback pertaining to user execution of the at least a portion of the one or more automation files containing at least a portion of the one or more workflows related to configuration operations on the at least one user-controlled cloud services component; and to perform one or more automated actions based at least in part on the feedback.

18. The apparatus of claim 17, wherein performing one or more automated actions comprises automatically executing, based at least in part on the feedback, at least a portion of the one or more automation files containing at least a portion of the one or more workflows related to configuration operations on at least one other of the two or more cloud services components.

19. The apparatus of claim 17, wherein generating the one or more automation files comprises inputting, in the one or more automation files, one or more placeholders for environmental information not provided by the at least one user.

20. The apparatus of claim 17, wherein performing one or more automated actions comprises automatically updating, based at least in part on the feedback, at least a portion of the one or more automation files containing at least a portion of the one or more workflows related to configuration operations on at least one other of the two or more cloud services components.

* * * * *